United States Patent [19]

Clements

[11] 4,222,576
[45] Sep. 16, 1980

[54] SEALING DEVICE

[75] Inventor: Harold J. Clements, Canterbury, England

[73] Assignee: Modern Precision Engineers and Associates Limited, Ashford, England

[21] Appl. No.: 9,790

[22] Filed: Feb. 6, 1979

[30] Foreign Application Priority Data

Feb. 7, 1978 [GB] United Kingdom ............... 4922/78

[51] Int. Cl.² .................... B65D 53/04; F16J 15/02
[52] U.S. Cl. ............................ 277/237 R; 220/77; 285/331
[58] Field of Search ............... 220/48, 67, 77; 285/331, 96, 235, 236; 277/237 R, 15, 16, 34.3, 34.6, 34

[56] References Cited

U.S. PATENT DOCUMENTS

| | | | |
|---|---|---|---|
| 2,182,995 | 12/1939 | Pepper | 285/331 |
| 3,032,356 | 5/1962 | Botsford | 285/331 |
| 3,334,908 | 8/1967 | Starbuck | 277/237 R |
| 3,764,037 | 10/1973 | Rothrock | 277/34.3 |
| 3,869,235 | 3/1975 | Moore | 277/16 |

Primary Examiner—Robert I. Smith
Attorney, Agent, or Firm—Bacon & Thomas

[57] ABSTRACT

A sealing device for providing a hermetic seal, for example between the body and lid of a container, comprises elongate interengageable sealing members of respectively male and female form in transverse cross-section, the two members being arranged to define an enclosed space extending lengthwise between them when interengaged, and means for drawing and holding a vacuum in such space to bring the members into sealing engagement along their lengths.

19 Claims, 9 Drawing Figures

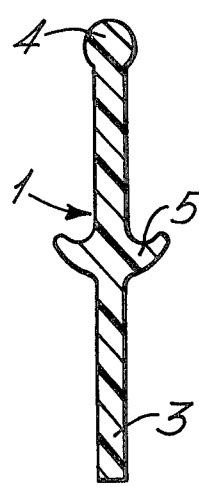
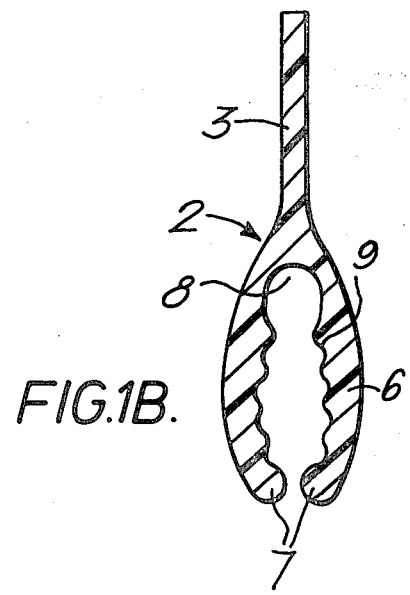
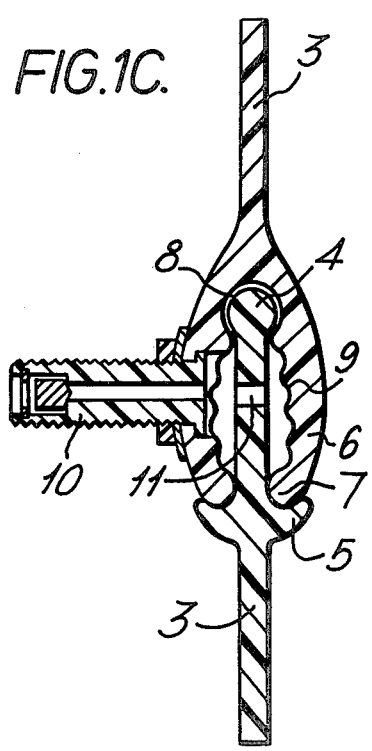
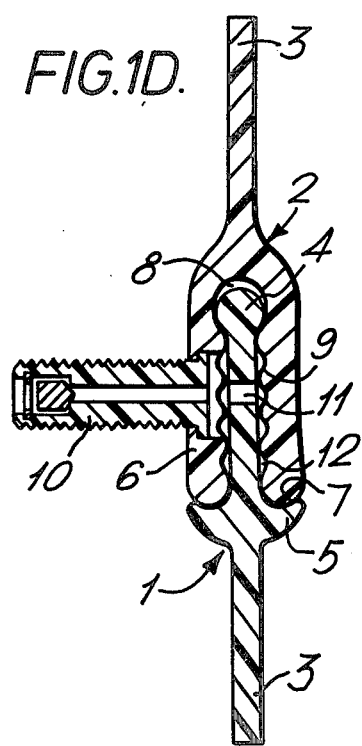

SEALING DEVICE

The present invention relates to a device for sealing together two articles or for sealing an opening in an article.

In the past, such seals have been effected by various means including clamped seals, resilient bands, pneumatic seals, sealed type zip-fasteners and other mechanically-operated closures with various degrees of efficacy and operational convenience.

It is known, also, that efficient sealing of jars, cans and other enclosed vessels may be effected by the practice of introducing a sub-atmospheric pressure (or 'vacuum') within the vessel so as to cause the lid or cap of the vessel to impinge with intimate pressure upon the joined rim surfaces of the respective components and thereby to create a pressure seal.

It is important to note in this connection that:
  (a) the vacuum-seal closure as described above is dependent upon a pressure depression applied to the contained volume within the vessel.
  (b) the closure system, as described, is dependent upon adequate rigidity of the joined components when in the sealed state.

The present invention provides a sealing device particularly but not exclusively suitable for use in airtight enclosures wherein it is advantageous to utilize a flexible seal arrangement for reasons of convenience, economy or technical adaptability, or wherein one or more component members of such enclosure structure is constructed from flexible membraneous material of impermeable nature which is required to be readily detachable from associated components of the said enclosure structure.

According to the invention there is provided a sealing device comprising two interengageable elongate members of which at least one has a resilient sealing surface extending therealong for sealing engagement with the other member, the two members being arranged to define a substantially enclosed space extending lengthwise therebetween when they are interengaged, and means associated with one of the members for evacuating said space so as to cause sealing engagement of the two members along their lengths.

Whilst it is preferred that the elongate members are endless, this is not essential, provided adequate sealing means are provided at each end of the elongate members. It is preferred that at least that elongate member provided with a resilient sealing surface is flexible. If the other elongate member is also flexible, a flexible joint is formed. Alternatively, the other elongate member may be rigid or semi-rigid. Suitable flexible materials include rubber and rubber-like polymers.

It is preferred for the elongate members to have cross-sections such that an initial interlocking occurs when the members are engaged with one another so as to secure the members together while the subsequent step of producing a vacuum or partial vacuum in the enclosed space between the two elongate members takes place.

In one form of the invention, one of the elongate members comprises the rim around the opening of a rigid or semi-rigid vessel. The other elongate member which engages the rim of the vessel may be provided on a flexible member adapted to close the opening.

A pair of devices according to the invention may be used to provide a jointing ring or band for connecting two objects together. The ring or band may be flexible or rigid as required. One example of such an arrangement is a ring having flexible elongate jointing members at each axial end thereof, which could be used to join together, for example, two impermeable pipes.

It should be noted that it is not essential for the two seal members to form a perfect seal before the vacuum or partial vacuum is drawn. In an analogous mode of operation of the fitting of a tubeless tire to a wheel, an approximate fit between the two seal members will be satisfactory to form a seal, provided air can be withdrawn from the seal at a sufficient rate.

In the accompanying drawings:

FIG. 1A is a section of a first elongate member;

FIG. 1B is a section of a second elongate member adapted to engage the elongate member of FIG. 1A;

FIG. 1C is a section of the elongate members of FIGS. 1A and 1B engaged with one another;

FIG. 1D shows the arrangement of FIG. 1C after a vacuum has been drawn;

Figure 2A:
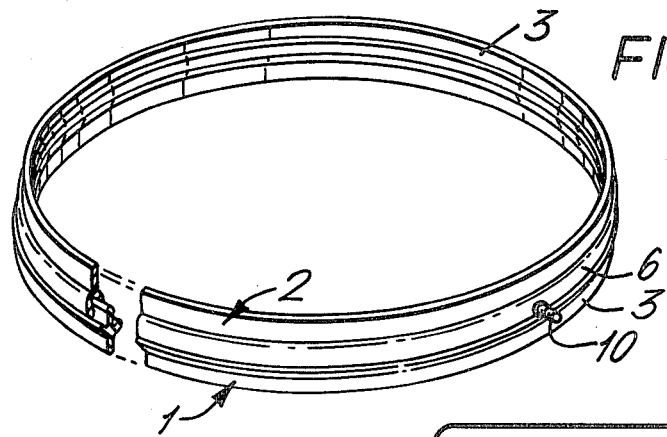
FIG. 2A is a perspective view partly broken away, of an embodiment of a device according to the invention.

FIG. 1A shows a cross-section of a flexible male seal member 1, in the form of an endless loop. The member 1 comprises a jointing flange 3 for joining the member to an article such as a flexible membrane, an enlarged head 4, and a pair of concave shoulders 5. The member 1 can be formed from a continuous flexible extrusion cut to the required length and butt jointed to form an endless sealing ring.

FIG. 1B shows a cross-section of a flexible female seal member 2 adapted to engage the male seal member 1. The member 2 is provided with a jointing flange 3 for the same purpose as that of member 1. On the flange 3 are arranged a pair of lips 6 terminating in rounded ends 7. Between the lips 6 are defined a rounded aperture 8 adapted to receive the head 4 of member 1 and corrugated surfaces 9. The member 2 may be formed by extrusion in the same way as member 1. The peripheral length of member 2 should, of course, be the same as that of member 1.

FIG. 1C shows the seal members 1 and 2 engaged mechanically, the enlarged head 4 being received in aperture 8, and the rounded ends 7 of the lips 6 being received in the concave shoulders 5. The mechanical engagement is facilitated by the flexibility of female seal member 2.

At one point in the periphery of seal member 2 there is provided a one-way valve 10. Valve 10 allows air to be drawn out of the space defined by the lips 6 of member 2. One or more cross holes 11 are provided in member 1 to allow air to be drawn from the space to the right of member 1 as shown in the drawing at the same time as the left hand space is evacuated.

FIG. 1D shows members 1 and 2 after a vacuum (or partial vacuum) has been drawn n the enclosed space through the valve 10, so as to cause the lips 6 to intimately engage the sides of member 1. The effect of the corrugation 9 is to enhance the sealing effect by producing a plurality of linear seals around the periphery of the ring. In this way, even if the vacuum in the lowermost ring 12, for example, is destroyed, the seal will be maintained by the remaining rings defined by the corrugated surface 9 and the member 1. In this way, the combined seal members 1 and 2 form a hermetic seal, and, provided both members are flexible, will form a unified flexible assembly until the vacuum is released.

FIG. 2A shows a complete sealing ring consisting of seal members 1 and 2. Whilst the seal is shown as being circular, it will be appreciated that the seal may take any desired form, dependant on the flexibility of the seal members.

Figure 2B:
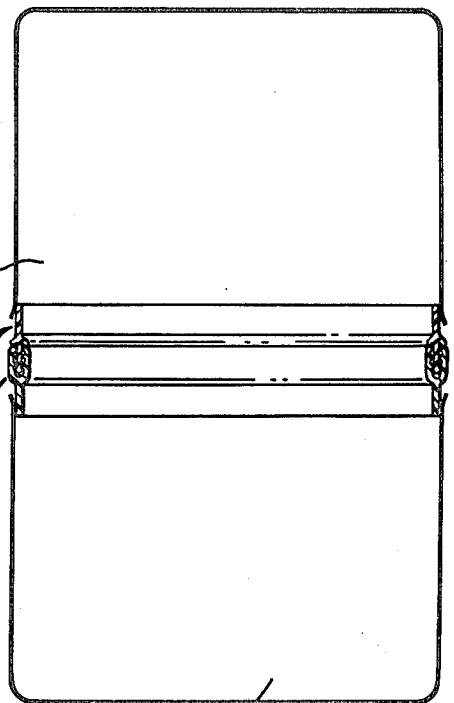
FIG. 2B is a section through an enclosure utilising the device of FIG. 2A.

FIG. 2B shows a cross-section of a sealed vessel incorporating the seal structure described above. Each of the seal members 1, 2 has bonded thereto a flexible envelope 13. Thus, an article which is to be protected from the environment is placed in the envelopes 13 which are air-tight, the members 1 and 2 are engaged with one another and air is withdrawn through valve 10. The pair of envelopes 13 thus form an airtight enclosure until the article is required and the seal is broken.

Either or both of the envelopes 13 may be replaced by a rigid or semi-rigid vessel or members of any desired shape.

Figure 3:
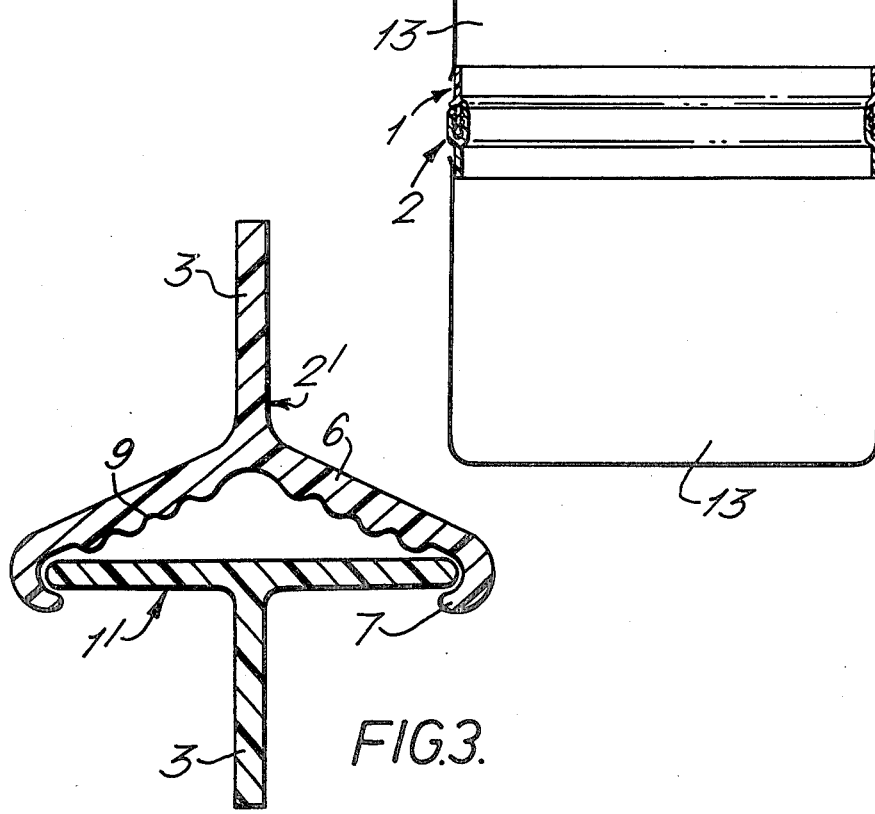
FIG. 3 is a view corresponding to that of FIG. 1C of a further embodiment of the invention.

FIG. 3 shows a further embodiment of the invention. This embodiment functions in a similar manner to that described above. However, it differs in that the male seal member 1' is T-shaped and the lips 6 of the female seal member 2' are opened out so as to engage the head of member 1. The initial mechanical engagement between the seal members takes place by virtue of the fact that the rounded ends 7 of the lips 6 engage the ends of the head of member 1. A vacuum can then be drawn in the space between the two members in the same manner as described above.

Figure 4A:
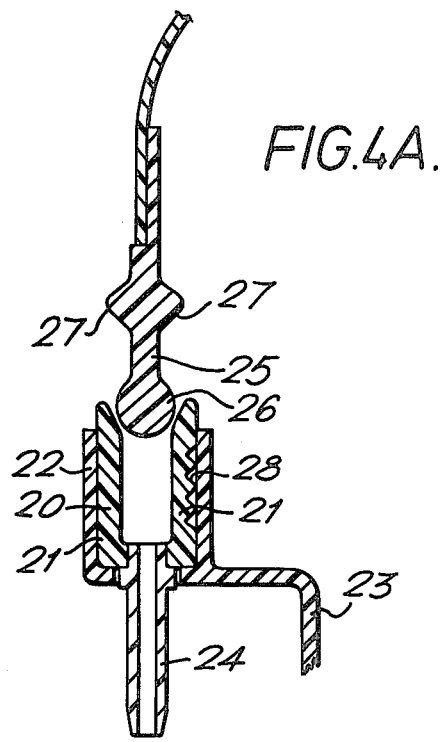
FIG. 4A is a cross-sectional view of the elongate members of another embodiment of the invention, before sealing interengagement.
Figure 4B:
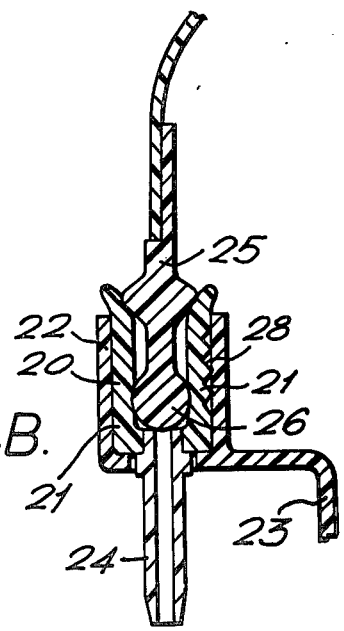
FIG. 4B shows the embodiment of FIG. 4A with the members sealingly interengaged.

FIGS. 4A and 4B show an embodiment in which a female seal member 20 is of substantially U-shaped cross-section with lips 21 and is received as a close fit in an annular channel 22 defining the rim of a container 23. Evacuating means in the form of a tubular plug 24 extends through the floor of the channel 23 and through the base of the member 20. In this embodiment the evacuating member does not itself incorporate a one-way valve; such a valve, or any other suitable means for holding the vacuum, may be provided in another fitting to be attached to the plug 24, and this can also be the case in the previous embodiments. A male sealing member 25 has an enlarged head 26 which is wider than the spacing between the lips 21, so that when the male member is presented to the female member as shown in FIG. 4A and vacuum is then applied, the male member is drawn into the female member and the head 26 makes sealing engagement with the lips 21 as shown in FIG. 4B. Furthermore shoulders 27 on the male member make sealing engagement with the ends of the lips. In addition one of the lips has corrugations 28 on its outside surface to make sealing engagement with the inside of the channel 22 when the lips are pressed outwardly by the enlarged head 26 of the male member.

The embodiments of the invention described above can be utilised in a large number of ways. Thus, for example, either or both the structures joined together need not be of sealed form. Owing to the fact that the vacuum seal is intrinsic to the seal itself, no limitation is imposed on the contents or structure of the members joined by the seal. A jointing ring or band could be provided with, for example, a female seal member of either of the forms described above at each axial end thereof. The band may be formed simply by providing two female seal members with a common "jointing flange". Such a band could be used to join together, for example, two pipes or closed cylindrical members, the rims of which provide male seal members with or without the particular features of the male seal members described above.

I claim:

1. A sealing device comprising two interengageable elongate members of which at least one has a resilient sealing surface extending therealong for sealing engagement with the other member, the two members being arranged to define a substantially enclosed space extending lengthwise therebetween when they are interengaged, and means associated with one of the members for evacuating said space so as to cause sealing engagement of the two members along their lengths.

2. A device as claimed in claim 1, wherein said elongate members are endless.

3. A device as claimed in claim 1 or 2, wherein at least one of said elongate members is flexible.

4. A device as claimed in claim 3, wherein the cross-sections of said elongate members are configured to interlock with one another.

5. A device as claimed in claim 1, including a pipe and wherein one of said elongate members comprises the end of said pipe.

6. A device as claimed in claim 1, including a rigid or semi-rigid vessel and wherein one of said elongate members comprises the rim around the opening of said vessel.

7. A device as claimed in claim 6, including a flexible member adapted to close said opening and wherein the other of said elongate members is provided on said flexible member.

8. A device as claimed in claim 1, including a jointing ring or band and wherein one of said elongate members is provided on said jointing ring or band, the latter also provided with a further such elongate member.

9. A device as claimed in claim 1, wherein the said elongate members are of generally male and female configuration in transverse cross-section.

10. A device as claimed in claim 9, wherein the female one of said elongate members comprises a pair of lips which in use extend on each side of the male member.

11. A device as claimed in claim 10, wherein the said male member has a pair of shoulders arranged in use to engage the ends of the lips.

12. A device as claimed in claim 10 or 11, wherein the inside surfaces of the said lips are corrugated so that, in use, said lips are in sealing contact with said male member at a plurality of discrete areas.

13. A device as claimed in claim 12, wherein the said male member has a plurality of apertures therethrough to facilitate evacuation of the space on both sides thereof.

14. A device as claimed in claim 10, wherein said male member has an enlarged head adapted to be received in a recess at the intermost region of the female member.

15. A device as claimed in claim 10, wherein the said evacuating means extends laterally through one of the said lips, whereby the lips are drawn inwardly into sealing contact with the male member upon evacuation.

16. A device as claimed in claim 10, wherein the said evacuating means extends through the female member at the root of and between the said lips and at least the leading end of the male member is wider than the spacing between the lips, whereby the male member is drawn into the female member between the lips in sealing engagement therewith upon evacuation.

17. A device as claimed in claim 16, wherein the said female member is closely fitted into a channel-shaped termination of an article which is to be sealed, such as the lip of a container, said termination including an exposed floor portion, the said evacuating means extending through said externally exposed floor portion of said termination.

18. A device as claimed in claim 17, said termination including a side wall area, wherein at least one of the said lips is corrugated on its outside face for sealing engagement with said side wall.

19. A device as claimed in claim 1, wherein the said evacuating means includes a one-way valve.

* * * * *